(12) United States Patent
Tayebnejad et al.

(10) Patent No.: US 7,113,932 B2
(45) Date of Patent: Sep. 26, 2006

(54) ARTIFICIAL INTELLIGENCE TRENDING SYSTEM

(75) Inventors: Mohammad Reza Tayebnejad, Colorado Springs, CO (US); Karl Aric Van Camp, Colorado Springs, CO (US); Charles Alan Dallas, Colorado Springs, CO (US); John Hans Van Arkel, Colorado Springs, CO (US)

(73) Assignee: MCI, LLC, Basking Ridge, NJ (US)

( * ) Notice: Subject to any disclaimer, the term of this patent is extended or adjusted under 35 U.S.C. 154(b) by 620 days.

(21) Appl. No.: 10/041,549

(22) Filed: Jan. 10, 2002

(65) Prior Publication Data

US 2002/0161731 A1  Oct. 31, 2002

Related U.S. Application Data

(60) Provisional application No. 60/266,864, filed on Feb. 7, 2001.

(51) Int. Cl.
*G06E 1/00* (2006.01)
*G06E 3/00* (2006.01)
*G06F 15/18* (2006.01)
*G06G 7/00* (2006.01)

(52) U.S. Cl. ............... 706/21; 706/15; 706/16
(58) Field of Classification Search ........... 706/21, 706/16, 15; 705/35
See application file for complete search history.

(56) References Cited

U.S. PATENT DOCUMENTS

| | | | |
|---|---|---|---|
| 5,262,941 A | 11/1993 | Saladin et al. | |
| 5,574,828 A | 11/1996 | Hayward et al. | |
| 5,696,907 A | 12/1997 | Tom | |
| 6,018,723 A * | 1/2000 | Siegel et al. | 705/38 |
| 6,105,007 A * | 8/2000 | Norris | 705/38 |
| 6,112,190 A | 8/2000 | Fletcher et al. | |
| 6,119,103 A * | 9/2000 | Basch et al. | 705/35 |
| 6,202,053 B1 | 3/2001 | Christiansen et al. | |
| 6,233,566 B1 * | 5/2001 | Levine et al. | 705/37 |
| 2001/0042002 A1 * | 11/2001 | Koopersmith | 705/10 |

OTHER PUBLICATIONS

Amir F. Atiya, Brankruptcy Prediction for Credit Risk Using Neural Networks: Survey and New Results, Jul. 2001, IEEE, 1045-9227/01, 929-935.*

* cited by examiner

*Primary Examiner*—Joseph P. Hirl

(57) ABSTRACT

A data processing system program to develop, train, and implement a neural network for identifying customers who represent a bad debt risk is disclosed. A feature vector is applied to a neural network to generate outputs that approximate the relative likelihood that customers who are the subjects of the records used to generate the feature vector will be a bad debt risk. Statistical values relating categorical attributes of the customers to the likelihood of their becoming a bad debt risk are substituted for the categorical attributes, and the attributes are normalized before the feature vector is applied to the network. In one embodiment the customers are customers of a long distance service provider.

40 Claims, 14 Drawing Sheets

| Field | Description |
| --- | --- |
| Customer ID | |
| BTN | Billed Telephone Number |
| trafficdate | Date record sent |
| productcode | Code of the product used by customer |
| dom_numcallsum | Number (sum) of domestic calls |
| dom_durationcallsum | Duration (sum) of domestic calls |
| dom_costcallsum | Cost (sum) of domestic calls |
| int_numcallsum | Number (sum) of international calls |
| int_durationcallsum | Duration (sum) of international calls |
| int_costcallsum | Cost (sum) of international calls |
| tgt_numcallsum | Number (sum) of target calls |
| tgt_durationcallsum | Duration (sum) of target calls |
| tgt_costcallsum | Cost (sum) of target calls |
| penflg* | Penitentiary History Data |
| crscore* | Credit Score |
| dtscore* | Decision Tree Score |

FIG. 12

| Customer Static Data | | Account Data | | Address Data | |
|---|---|---|---|---|---|
| Field | Description | Field | Description | Field | Description |
| statuscode | Status Code | currentbalance | Current Balance | addcode | Address code |
| installdate | Installation date | balancedue | Balance due | zipcode | Zip code |
| canceldate | Cancellation date | pastdue | Past due amount | | |
| cancelcode | Cancel code | numcycdelq | Number of cycles delinquent | | |
| salescitycode | Sales city code | | | | |
| fornlangind | Foreign language indicator | | | | |
| regioncode | Region Code | | | | |
| collecttypcode | Collection Type Code | | | | |
| callplancode | Call Plan Code | | | | |
| paymethodcode | Pay Method Code | | | | |
| intcadind | International Customer Address Indicator | | | | |
| mktprogind | Current Marketing Indicator | | | | |
| mktid | Marketing ID | | | | |

FIG. 13

|  | Field | From |
|---|---|---|
| Customer Header Info | Customer ID | Traffic Record |
|  | btn | Traffic Record |
|  | trafficdate | Traffic Record |
|  | canceldate | Traffic Record |
|  | cancelcode | Traffic Record |
| Customer Continuous Fields | ccflag | Derived |
|  | statuscode | Customer Static Data |
|  | salescitycode | Customer Static Data |
|  | forlangind * | Customer Static Data |
|  | regioncode | Customer Static Data |
|  | collecttypecode | Customer Static Data |
|  | callplancode | Customer Static Data |
|  | paymethcode | Customer Static Data |
|  | intlcaddind * | Customer Static Data |
|  | mktgproind | Customer Static Data |
|  | curmktgindmktid | Customer Static Data |
|  | addcode | Address Data |
|  | zipcode * | Address Data |
|  | zipint | Derived |
|  | penflg * | Derived |
|  | npa | Derived |
|  | npanxx | Derived |
|  | productcode | Traffic Record |
|  | dtscore | Decision Tree Score |
|  | AgeRate | Derived |

FIG. 14A

| | Field | From |
|---|---|---|
| Customer Continuous Fields | Nshort | Derived |
| | Nlong | Derived |
| | dom_numcallsum | Traffic Record |
| | dom_durationcallsum | Traffic Record |
| | dom_callcostsum | Traffic Record |
| | short_dom_numcallsum | Derived |
| | short_dom_durationcalls | Derived |
| | short_dom_costcallsum | Derived |
| | long_dom_numcallsum | Derived |
| | long_dom_durationcalls | Derived |
| | long_dom_costcallsum | Derived |
| | int_numcallsum | Traffic Record |
| | int_durationcallsum | Traffic Record |
| | int_callcostsum | Traffic Record |
| | short_int_numcallsum | Derived |
| | short_int_durationcalls | Derived |
| | short_int_costcallsum | Derived |
| | long_int_numcallsum | Derived |
| | long_int_durationcalls | Derived |
| | long_int_costcallsum | Derived |
| | tgt_numcallsum | Traffic Record |
| | tgt_durationcallsum | Traffic Record |
| | tgt_callcostsum | Traffic Record |
| | short_tgt_numcallsum | Derived |
| | short_tgt_durationcalls | Derived |
| | short_tgt_costcallsum | Derived |
| | long_tgt_numcallsum | Derived |
| | long_tgt_durationcalls | Derived |
| | long_tgt_costcallsum | Derived |

FIG. 14B

| | Field | From |
|---|---|---|
| Customer Continuous Fields | tot_numcallsum | Derived |
| | tot_durationcallsum | Derived |
| | tot_callcostsum | Derived |
| | short_tot_numcallsum | Derived |
| | short_tot_durationcalls | Derived |
| | short_tot_costcallsum | Derived |
| | long_tot_numcallsum | Derived |
| | long_tot_durationcalls | Derived |
| | long_tot_costcallsum | Derived |
| | currentbalance | Account Data |
| | balancedue | Account Data |
| | Pastdue | Account Data |
| | numcycdelq | Account Data |
| | Acntage | Derived |

FIG. 14C

ARTIFICIAL INTELLIGENCE TRENDING SYSTEM

RELATED APPLICATIONS

This application is related to, and claims the benefit of the earlier filing date under 35 U.S.C. § 119(e) of, U.S. Provisional Patent Application (Ser. No. 60/266,864, filed Feb. 7, 2001, entitled "AN ARTIFICIAL INTELLIGENCE TRENDING SYSTEM", the entirety of which is incorporated herein by reference.

FIELD OF THE INVENTION

The present invention relates an information processing system, and is more particularly related to an artificial intelligence based trending system. As used herein "trending system" refers to a system which rank orders subjects, or records relating to the subjects, in a manner which correlates with the likelihood that, or extent to which, subjects of the records have a particular characteristic; so that, as the records are updated, changes in the relative likelihood that the subjects have the characteristic, i.e. trends, can be detected.

BACKGROUND OF THE INVENTION

With modem technology it has been possible to collect extensive records, which describe attributes of subjects of the records. In particular companies can develop records that describe many attributes of their customers. It would be desirable if these records could be used to predict which customers, i.e. subjects of the records, are relatively more likely to have a particular characteristic which is not explicitly described by the attributes in the records. That is, it would be desirable if the records could be rank ordered in a manner that correlates with the relative likelihood that the corresponding customers would, for example, buy a particular product. It would be particularly desirable if the records could be rank ordered in a manner correlating with the relative likelihood that customers would become bad debt risks. By "bad debt risk", or sometimes "toll risk" in the context of long distance services, herein is meant a customer who is sufficiently delinquent in payment to create a substantial risk of non-payment.

This need is particularly acute for long distance telephone carriers where at any time totals of hundreds of millions of dollars are owed by millions of customers for long distance telephone service. The need for an early identification of toll risks is even greater for carriers, such as the assignee of the present invention, who have a "no-denial" policy; that is carriers who do not use any criteria to deny service to customers. Previously the above mentioned assignee has used two "toll risk" strategies to deal with this bad debt problem: a High Toll System (HTS), and a Collection Strategy System (CSS). The High Toll System generates alarms based on dollar amounts and call detail thresholds. The dollar amount and call detail from the High Toll alarm are then compared to the customer's normal billing history. Computer algorithms and/or human analysis are then used to determine if the customer's service should be deactivated, sometimes hereinafter referred to "blocking the account". The other system, the Collection Strategy System, is a time based collection management system triggered from the last paid invoice. CSS used a commercial credit score to predict the likelihood of an applicant or established customer becoming a serious credit risk to determine which collection strategy to use for each of the applicants or customers. Currently CSS uses various collection strategies and timelines based on the calculated risk of bad debt before a warning is sent or other action is taken.

While the above described systems have proven to be somewhat effective it would clearly be desirable to reduce the losses attributed to bad debt. Further, it has been found that as much as two thirds of all write-offs come from one third of new customers. Consequently there is a need for a system that would allow prompt analysis of the behavior of new customers and allow early intervention to minimize delinquencies.

SUMMARY OF THE INVENTION

These and other needs are addressed by the present invention by means of a method and system, and computer-readable media carrying instructions for controlling the system to carry out the method. In accordance with an embodiment of the present invention a rank order for records with respect to a selected characteristic of subjects of the records is estimated. The records include attributes of the subjects, and the attributes generally include at least one, and typically more than one, categorical attribute. By "categorical attribute" herein is meant a representation of discrete classes or categories which, in its raw form, has no mathematical significance. The numeric value or label of a categorical attribute serves only to distinguish among various categorical attributes. For example, the area code 540 associates the subject with a particular geographic area within Virginia, but does not indicate five hundred and forty of anything; and the sum, difference, or average of two or more area codes is not meaningful.

The system is programmed to derive any derived categorical attributes used and carry out the steps of: a) estimating statistics relating values of the categorical attributes to the characteristic; b) for one of the records, applying a feature vector having elements derived from the attributes in the one record, the elements including values of the statistics corresponding to a values of the categorical attributes in the one record, to an artificial intelligence algorithm, which is preferably a trained neural network, to obtain an output value; c) repeating step b for each remaining one of the records; and d) rank ordering the records in accordance with the output values.

In accordance with an aspect of the invention the subjects are customers of a provider of goods or services and the characteristic is potential to be a bad debt risk.

In accordance with another aspect of the invention the provider is a provider of long distance services, and the attributes include attributes derived from current traffic data.

In accordance with another aspect of the invention the attributes include attributes derived from customer data.

In accordance with another aspect of the invention the statistic is derived from a statistic data set comprising a time line of archived records for the subjects and corresponding data related to the characteristic for each subject.

In accordance with another aspect of the invention the corresponding data is data relating to deactivations of services provided to a customer.

In accordance with another aspect of the invention the elements of the feature vector are normalized.

In accordance with another aspect of the invention the input records are normalized with respect to the statistic data set.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 12 shows a traffic data record.

FIG. 13 shows a customer data record.

FIGS. 14A, 14B and 14C shows a feature vector of customer attributes derived from data shown in FIGS. 12 and 13 and used as input to a neural network in accordance with an embodiment of the present invention.

DESCRIPTION OF THE PREFERRED EMBODIMENTS

Figure 1:
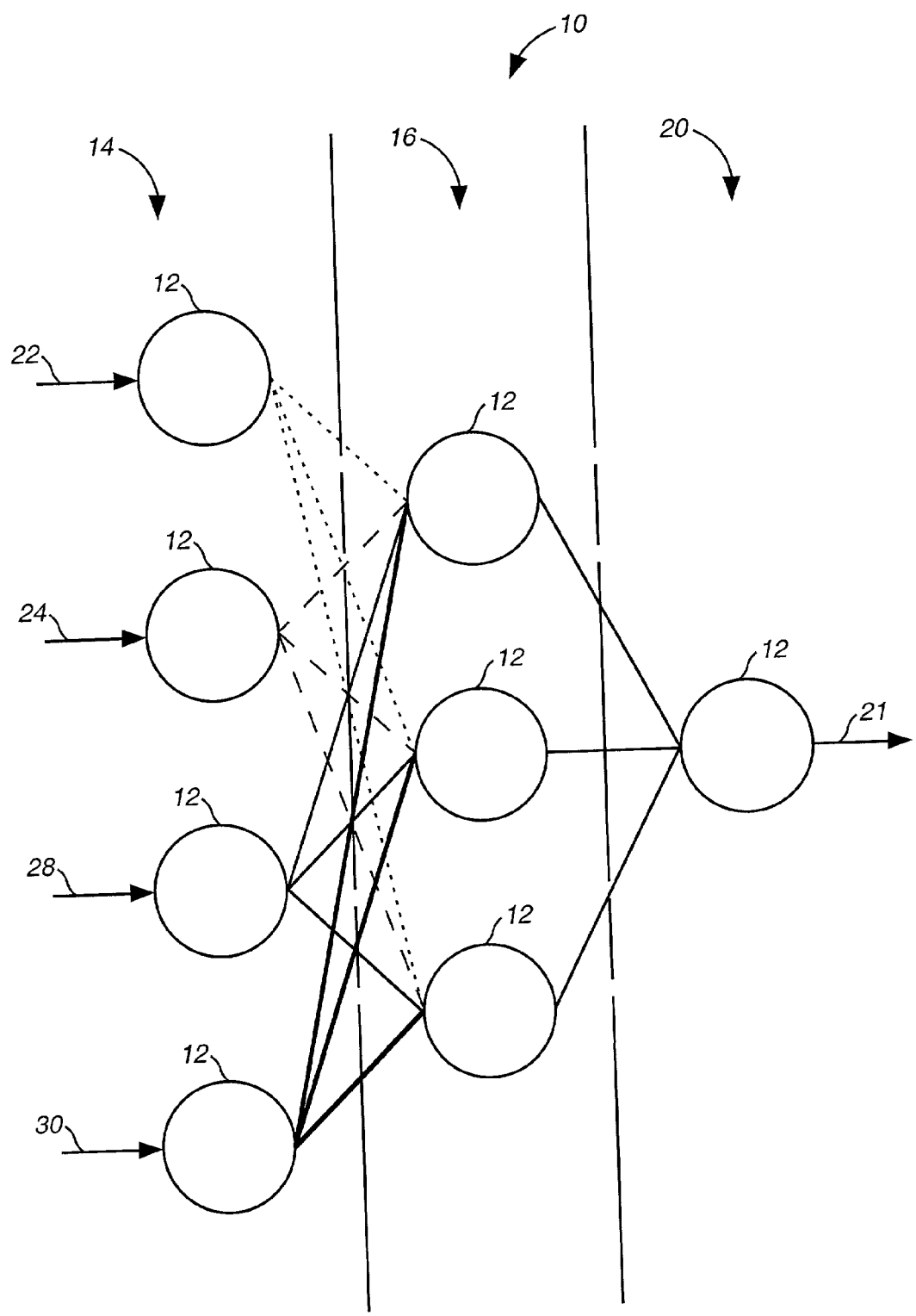
FIG. 1 shows a schematic diagram of an illustrative neural network.

A system, method, and software for estimating a rank order for records with respect to a selected characteristic of subjects of the records are described. In the following description, for the purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid unnecessarily obscuring the present invention.

It should be noted that while the preferred embodiment described below relates to rank ordering of records of attributes of telephone customers in accordance with the relative likelihood that these customers will become bad debt risks the subject invention also relates to the rank ordering of records of attributes of any subject with respect to any characteristic which can be estimated or predicted from such attributes.

In a preferred embodiment, a system in accordance with the present invention processes a daily data flow of a telephone carrier's residential and small business customer accounts that had long distance call activity for that particular day. Typically, there are on the order of six million accounts processed daily, and for each account a traffic record is processed which contains the customer identifier (CID), aggregate call information for the day, the date of the record, the product (or service) used, and the bill-to-number (BTN). Preferably, the system receives the traffic record as quickly as possible while ensuring that all call data is included; to ensure all call data is included for all accounts. The system processes each account's traffic record by

- merging it with additional customer information and account balance information,
- deriving additional features (attributes) from the traffic information,
- calculating an artificial intelligence (hereinafter sometimes "AI") score by sending the merged record into the neural network, and
- calculating a prioritization value by combining the probability associated with the neural network score and the probability associated with the current account balance.

The AI score correlates to the probability that the customer will not pay for the services used on this account (i.e. the account is a toll risk, or bad debt). The prioritization value is computed by considering both the account's AI score toll risk probability, and the account's current balance toll risk probability. Thus, the prioritization value factors in the financial risk to the carrier if the balance is not paid. For each traffic record received, the system sends the AI score and the prioritization value back to the carrier's existing credit risk management system. This information is used within the credit risk management system to prioritize the order in which accounts are reviewed by human analysts, who make the determination of what action if any, is to be taken in regard to particular accounts. (Details of particular credit risk management systems need not be discussed further for an understanding of the present system.)

The traffic data received each day by the system contains the raw traffic record for each account that used its long distance services. The following description outlines the processing of a single account's raw record into a complete feature vector that can be input to the neural network. Each account record in the traffic data is processed in the same way.

Each raw traffic record contains usage information, including the number of calls, the duration of calls, and the cost of calls, for all calls, for domestic calls, and for international calls made on a given account in a single day. This daily usage information is also combined with previous days' records in order to compute aggregate number, cost, and duration features over both a short and a long interval (or window). Currently, the short window is 4 days and the long window is 9 days, but this can be varied as necessary to optimize the system performance. Additionally, categorical attributes such as the NPA (or area code) and NPANXX (area code and exchange) are derived from the raw record. At the conclusion of this step, the feature vector now consists of original data and derived features including the usage information for daily, short, and long intervals.

Next, the feature vector is further expanded by merging it with the customer data available in the databases; the customer data is found by matching the CID provided in the raw traffic record to the same CID in the databases. The customer data includes information from the account tables, the static tables, the address tables, and the credit tables. Additional derived attributes may be calculated from this information. Now the attribute feature vector contains both raw and derived categorical fields, and raw and derived continuous (or numeric) fields. A typical feature vector (sometimes hereinafter "attribute record") is shown in FIGS. 14A, B and C.

The continuous (numeric) fields are ready to be normalized. However, the categorical fields need to have their values replaced by meaningful numeric values that allow normalization. This is accomplished by replacing the raw and derived categorical fields with their corresponding toll risk probabilities (technically, these are conditional probabilities: given a categorical value, then this is the associated probability of the target, i.e. bad debt.). These probabilities are computed and stored during the pre-processing phase in the off-line development environment, as will be described further below.

At this point, all fields in the feature vector are numeric and can be normalized by a linear transformation $f[x]=ax+b$ (e.g. subtracting each element in the feature vector from its average with the result being divided by the element's standard deviation). The averages and standard deviations for each field are from a scale file computed during the pre-processing phase in the development environment, as will be described further below. The normalized feature vector is used as the input vector for a selected AI algorithm, which, in the embodiment described below, is a neural network.

A neural network topology and the weight files corresponding to that topology are created during the development of the network, through the pre-processing, training, and evaluation cycles. The topology and weights are the data through which the software models the operation of the neural network. The normalized feature vector is input to the neural network, and each of the features in the feature vector is processed to produce a single number, the AI score. (This is repeated for each feature vector corresponding to each unique account that is represented in the traffic data as a raw traffic record) The AI score represents the propensity for the account to become a toll risk. The score ranges from 1.0 (highest propensity) to 0.0 (the lowest propensity).

A higher outstanding current balance on an account represents a larger financial risk to the carrier in the case of bad debt. For example, two accounts may both receive a neural network score of 0.95 representing an equal likelihood of bad debt; however, if one of the accounts has a current balance of $500 while the other has a current balance of $20, then the first account represents the greater financial risk. In order to prioritize the accounts considering the current balance of the account (or of any other variable of interest), the toll risk probability distributions of the AI score and the current balance must be pre-processed in the development environment. Once these probability distributions are known, the prioritization value is computed by adding the toll risk probability of the account's AI score to the toll risk probability of the account's current balance and dividing by the maximum priority obtainable:

$$\text{Priority}=[\text{Prob}(AI)+\text{Prob}(balance)]/[\text{MaxProb}(AI)+\text{MaxProb}(balance)]$$

The resulting prioritization value ranges from 1.0 (the highest financial risk) to 0.0 (the lowest financial risk). When all the accounts are presented for analysis in order of this prioritization value, the result is that accounts having a higher probability of bad debt, as well as a larger financial risk, are reviewed sooner. While the above expression for the prioritization value is preferred, other expressions for computation of a prioritization value will be apparent to those skilled in the art and are within the contemplation of the present invention.

Proper pre-processing of the available data is critical to the present invention, and is generally more important than the particular choice of AI algorithm (e.g. neural network versus clustering). During the development cycles a large amount of time is spent analyzing and pre-processing the data to be used in the system. This pre-processing includes
    designing the derived attributes and selecting attributes for the feature vector,
    generating the statistics files and processing the sparse data anomalies out of them,
    generating the scale files for normalizing the feature vector,
    generating the weight files for the designed neural network topology, and
    generating the toll risk probability distribution curves for the variables used in the priority score.

These off-line computations can then be used in real-time processing of the daily traffic records.

The effectiveness of individual attributes (features) in the feature vector will depend on the characteristic of the attribute to display a separation between the signal (bad debt) records and noise (non-bad debt) records. Raw attributes are either categorical or continuous (numeric) fields that can be used in the form in which they are found (whether in the customer database or in the traffic record). Derived attributes are attributes that are formed or calculated by processing one or more pieces of raw data to obtain a derived categorical or continuous attribute. These derived attributes are usually designed using some knowledge of the problem domain that will result in a separation between the signal (target value, e.g. bad debt), and the noise. An example of good separation for a continuous attribute would be to have an average value of 2.0 with a standard deviation of 1.0 for signal records, and an average value of 10.0 with a standard deviation of 2.0 for noise records. This attribute shows a clear separation between the signal and noise records and could help the neural network in training and detection of the target record. An example of good separation for a categorical attribute would be signal probabilities that were consistently and significantly higher or lower than the overall population signal probability. This sets up an underlying probability distribution that can be learned in training sessions and assist in signal detection.

A final measure of the effectiveness of all attributes in the feature vector is to use a relevance analysis technique that rank orders the attributes after scoring each attribute using different evaluation methods. Typically 4 evaluation methods that are often employed in decision tree design (chi square test, uncertainty test, information gain test, and the gini test) are used, and each attribute is ranked based on the sum of its rank provided by the 4 evaluation methods. This "voting" type of approach is believed to be more accurate than using any one of the four methods alone. From the final relevance analysis ranking, it is often possible to build a network with fewer attributes while maintaining the same accuracy, as will be described further below.

Statistic files contain probabilities of bad debt that are used to convert categorical attributes into numeric features, thus allowing for normalization of the categorical field. For example, if one of the categorical attributes is color, then the probability for the color BLUE is calculated by dividing the number of target (bad debt) feature vectors in statistics set having the value BLUE by the total number of feature vectors having the value BLUE. The default bad debt probability, i.e. the bad debt probability of the entire population, is also contained in these files. The probabilities become more accurate as more data is used in their calculation, thus it is important to use as much relevant data as possible when calculating probabilities. However, data that is too old to represent current trends should not be used in statistics file generation. This can be handled by weighting older data less heavily than recent data. Also, current data that will be used in the evaluation data set should not be used in statistics file generation (to prevent "cheating"). In general, the more distinct values that a categorical attribute exhibits, the less data is available for calculating the probabilities of the individual values. Less frequently appearing values of a categorical attribute also have less data that is available for calculating the probability of those values. To obtain a statistically significant sample size for the calculation of probabilities for every categorical field, as much relevant data as possible must be used.

Once the statistics have been generated, each probability and the population that contributed to that probability must be evaluated to adjust for sparsely populated attributes. The default probability is calculated by dividing the number of target (bad debt) feature vectors by the total number of feature vectors in the statistics set. (This is the most stable probability based on population, but is the lowest resolution probability distribution.) Next, each of the remaining probabilities in the stat files and the populations that they are based on is examined. If the population is above the statistically significant sample size (Nmax), the probability is used as calculated. If the population is below the sample size defining the level for statistical sparse data (Nmin), the probability is replaced with the default probability for the entire population. Nmax and Nmin are configurable based on exploratory data analysis. Nmax is greater than Nmin, and with a statistics population (Nstat) that falls between Nmin and Nmax, a weighted probability (Weighted_Prob) is calculated using the statistics file probability (Stat_Prob) and the default probability (Default_Prob). This calculation is given by the equation:

$$Weighted\_Prob = Default\_Prob*(Nmax-Nstat)/(Nmax-Nmin) + Stat\_Prob*(Nstat-Nmin)/(Nmax-Nmin).$$

This avoids generating inaccurate and misleading probabilities for sparsely populated categorical attributes. Other advantages of substituting the probability for the categorical value include a) ease of maintenance (simply by replacing the statistics file the system can handle new categorical values, e.g. a new value for NPA), and b) the training process can be conducted on a smaller set of records, while still obtaining the accuracy, effectiveness, and knowledge contained in the much larger statistics data set.

While the present embodiment of the invention operates in an environment with 'clean' data (i.e. not errored data), similar application might not have that luxury. In the presence of errored data, robust statistical methods should be used to avoid statistical breakdown due to outliers.

To perform the relevance analysis of the attributes in the feature vector, the processed statistic files are used for the categorical attributes. The continuous attributes however, need to be digitized, or placed into discrete bins, and the probability for each bin must be calculated. This effectively transforms the continuous attributes into categorical attributes with the categories for the continuous attributes becoming the discrete bins into which the continuous data is processed. This process is an iterative one, because as with the case for the categorical fields, the bin populations need to be of a statistically significant sample size. Initially, the bin sizes are guessed at, and after an initial run of the data, the boundaries of the bins are adjusted. Subsequent runs of the continuous data into the bins with adjusted boundaries, result in bin populations that are of statistically significant size. This validates the bin probabilities that are calculated for the continuous attributes. The continuous bin probability information is written into data files for relevance analysis with the stat files. In other embodiments of the present invention bin sizes can be determined with a supervised algorithmic technique.

Relevance analysis allows the system designer to evaluate the effectiveness of an attribute being considered for inclusion into the feature vector. It rank orders the attributes with respect to each other to give the designer a feeling for which attributes most help the network, and which attributes least help the network. With this information, attributes can be added or deleted from the feature vector with analytical insight. For example, an attribute with a small relevance (little information) requires more training data to capture the information it contains, as well as more internal parameters in the learning technique (which is generally less robust). The processed stat files and the data files, which contain the basic information relating to the attributes in the feature vector, are processed and ranked by four different analytical techniques. Each technique assigns a partial score to an attribute. The overall rank is based on the summation of the scores from each analytic technique. These techniques are the chi square test, the uncertainty test, the entropy or information gain test, and the gini test. Details of these tests are known to those skilled in the art and need not be described further here for an understanding of the present invention.

With the relevance analysis complete and the feature vector attributes rank ordered, a correlation analysis should be performed to determine the correlation co-efficient between each of the attributes. The correlation analysis is performed by processing the normalized feature vector records into a covariance matrix, and extracting the correlation coefficients from the covariance matrix. With this information, the feature vector can be further pruned by eliminating the least relevant of any highly correlated attributes.

Averages and standard deviations are calculated for all fields in the training sample of the feature vector. These values are written to the scale file. The scale file is used to convert the original feature vector into a normalized feature vector.

With the number of attributes in the feature vector known, the topology of the neural network is designed. This includes the number of input nodes, the number of hidden layers, the number of nodes in each hidden layer, and the number of nodes in the output layer. The weight files for the designed network topology are generated by iterative training sessions that minimize the error signal.

In order to prioritize the accounts considering the current balance of the account (or any other variable of interest), the toll risk probability distributions of the AI score and the current balance (or other variable) must be pre-processed in the development environment. This is done in the same way that the continuous fields are digitized for the relevance analysis. The AI score and the balance are placed into discrete bins, and the probabilities for each bin are calculated. The bin populations need to be of a statistically significant sample size. Once these probability distributions are known, the prioritization value is computed by adding the toll risk probability of the account's AI score to the toll risk probability of the account's current balance and dividing by the maximum priority obtainable:

Priority=[Prob(AI)+Prob(balance)]/[MaxProb(AI)+ MaxProb(balance)]

The resulting prioritization value ranges from 1.0 (the highest financial risk) to 0.0 (the lowest financial risk).

FIG. 1 is a schematic representation of a portion of a conventional feed-forward neural network that can be used to implement the above described embodiment of the present invention. Network 10 is comprised of a plurality of neurons 12 which are arranged in layers. In network 10 neurons 12 are arranged in three layers, input layer 14, "hidden" layer 16 and output layer 20. Each neuron 12 generates an output, for example a non-linear function of the outputs of each neuron 12 in the previous layer. Inputs 22, 24, 28, and 30 to input layer 14 are elements of an input vector, sometimes hereinafter referred to as "a feature vector", and, in the embodiment described below, are attributes of a subject, expressed numerically. In the embodiment described below network 10 has only a single output node in output layer 20 to generate scalar output 21, preferably ranging from 0 to 1, as a function of the input vector which can be used to rank order records of subject attributes, as will be described further below; though it should be noted that networks having multiple output nodes and generating vector outputs exist.

Figure 2:
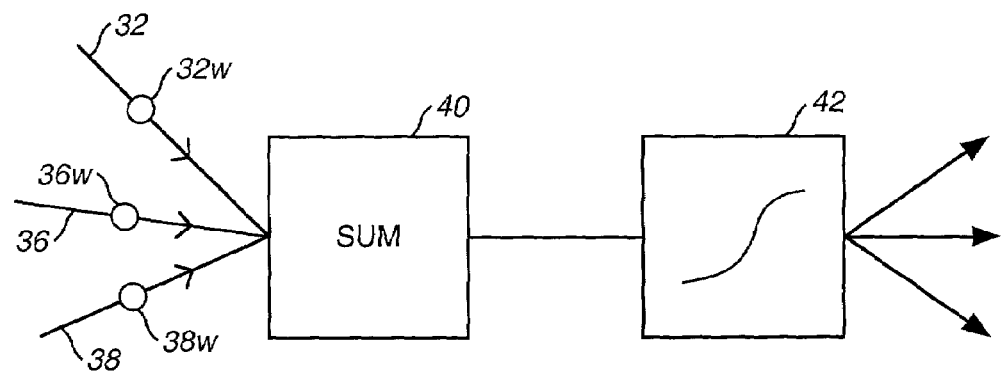
FIG. 2 shows a detailed schematic diagram of a neuron of the network of FIG. 1.

FIG. 2 shows a more detailed schematic diagram of a neuron 12. Each neuron 12 comprises inputs 32, 36, and 38, each having an associated weighting element 32W, 36W, and 38W, which applies a unique weighting factor to the corresponding input; a summing circuit 40 which produces a sum of the weighted inputs; and limiter 42 which applies a function, e.g. a sigmoid function, to the weighted sum to generate the output of neuron 12. While, for ease of illustration, neuron 12 has been shown having three inputs it will be understood that neuron 12 may have any number of inputs. Those skilled in the art will recognize that the intelligence, or pattern recognition ability, of network 10 is determined by the weights applied to the neuron inputs. Preferably, these weights are developed by training network 10 using a back-propagation learning algorithm, as will be described further below.

Those skilled in the art also will recognize that other network topologies and learning algorithms exist and may be useful in the practice of the present invention; as do different types of artificial intelligence algorithms that can be used to identify relevant patterns in the attributes of customers. However, it is believed that the choice of particular neural network topologies and learning algorithms, or types of artificial intelligence algorithms do not as strongly affect the performance of the present invention as the selection and pre-processing of attributes. It is believed that the selection and pre-processing of attributes, and particularly the use of estimates of rates of occurrence of the characteristic of interest associated with particular categorical attributes as substitutes for those attributes as input to the selected algorithm, is more critical; and a simple three layer, feed-forward network using back-propagation learning is preferred as most simple. However, the present invention contemplates the periodic evaluation of other topologies and learning algorithms, and other types of artificial intelligence algorithms to ensure that this remains the case as situations change. Known algorithms which it is believed may be useful in other embodiments of the present invention include, but are not limited to: clustering algorithms, decision trees, genetic algorithms, Bayesian belief networks and support vector machines. The description of such other topologies and algorithms is not believed necessary for an understanding of the present invention. Those skilled in the art will also understand, that, although network 10 has been illustrated as a free standing network, typically neural networks are not implemented as hardware networks, but are simulated on a data processing system, as will be described further below.

Figure 3:
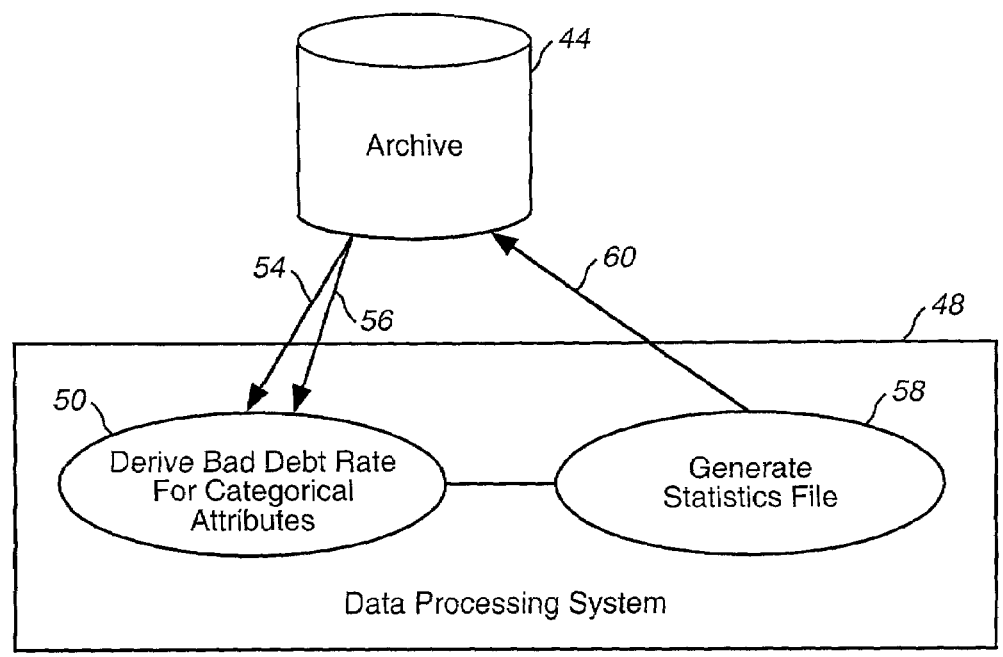
FIG. 3 shows a data processing system executing program code for generation of statistics files of bad debt rates for customers sharing particular categorical attributes.
Figure 5:
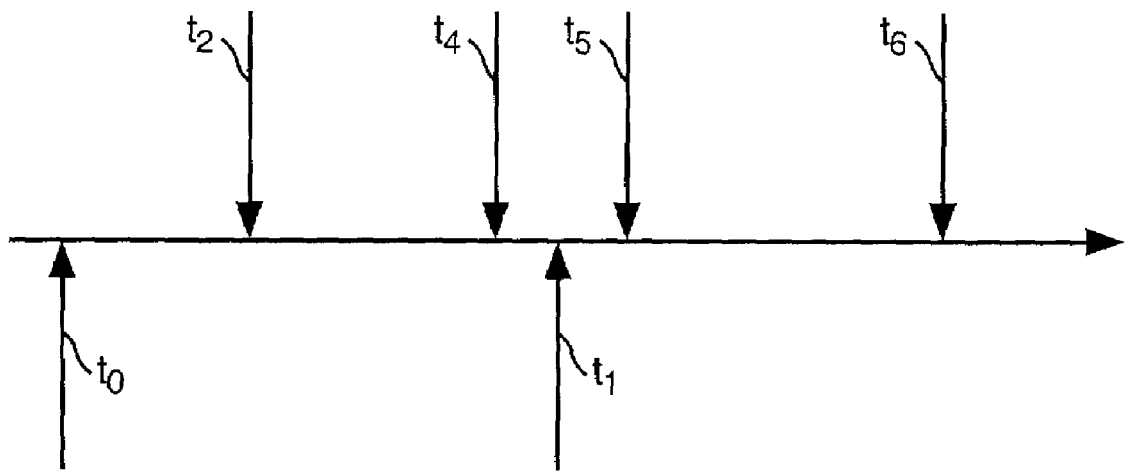
FIG. 5 shows a time line of archived traffic records from which a statistical file data set, a training data set, and an evaluation data set are selected.

FIG. 3 shows a system for carrying out steps for generating a statistics file that relates categorical attributes to characteristics of subjects. In FIG. 3 archive data store 44 stores a periodic time sequence of archived traffic records 123 (shown in FIG. 9) for customers. Archive 44 also stores a record of customer deactivations, i.e. "account blocks" or discontinuations of service for non-payment. Program code 50 controls data processing system 48 to download statistics file data set 54, a subset of archived traffic data records 123 for the time interval $t_0$ to $t_1$, shown in FIG. 5, and also downloads associated deactivation records 56. For each categorical attribute included in the traffic data records program code 50 then controls data processing system 48 to compute a bad debt rate as the number of customers sharing a particular characteristic attribute, e.g. a particular area code, whose service has been deactivated during the time interval $t_0$ through $t_1$+some configurable delta time divided by the total number of customers sharing that particular attribute. Program code 58 then controls data processing system 48 to generate statistics file 60 for each particular categorical attribute that relates that attribute to its corresponding bad debt rate and returns statistics file 60 to archive 44. Appropriate numbers of records for generation of statistics file 60 will vary with particular applications and can be determined by those skilled in the art by balancing of the costs and requirements of particular applications. In the embodiment disclosed in the present application, a statistics file data set of approximately $6 \times 10^8$ records has proven satisfactory. The initial time sequence of archived traffic data records can be stored in archive 44 in a manner as will be described further below, or in any other convenient manner.

Figure 4:
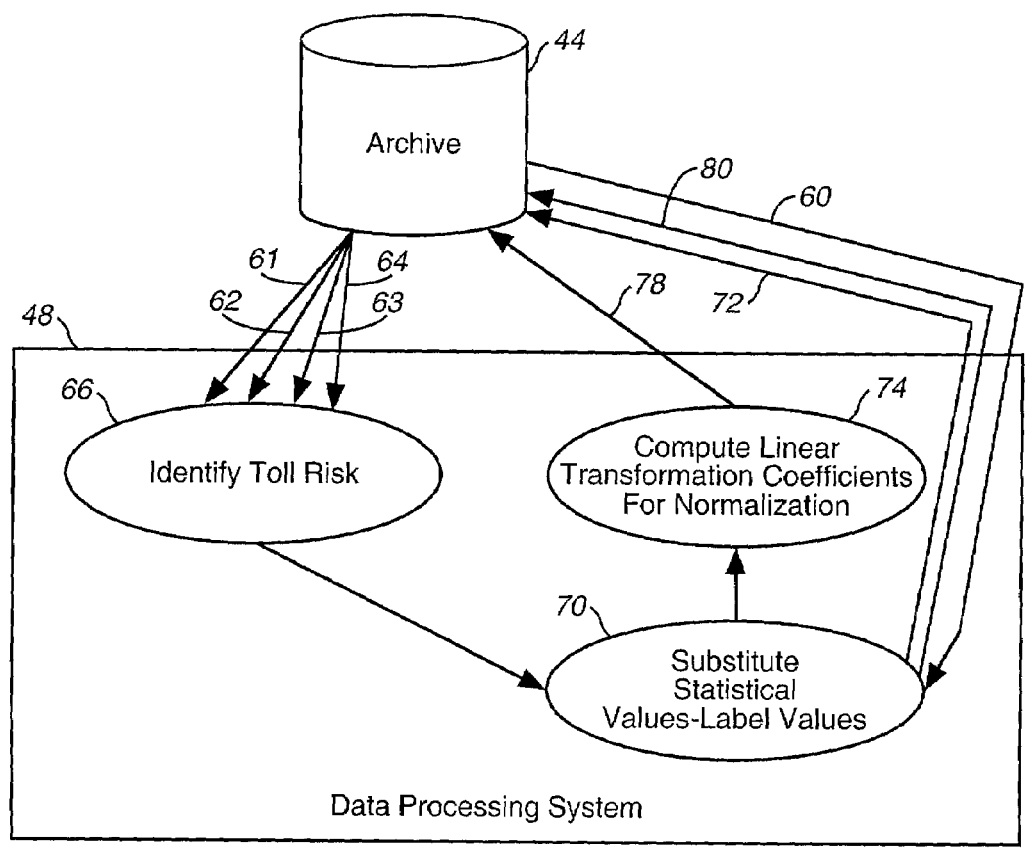
FIG. 4 shows a data processing system executing a program code for the generation of a scale file and modified traffic data records.

FIG. 4 shows a system for carrying out steps for generating training records, evaluation records, and a scale file. By "scale file" herein is meant a file containing coefficients for normalization, e.g. mean values and standard deviations for each attribute in the traffic data records.

Training data set 61 is selected on a sub-interval from $t_2$ through $t_4$ of intervals $t_0$ through $t_1$, (shown in FIG. 5) so as to be a sub-set of statistics file data set 54. While training data set 61 is shown as a sub-interval for ease of illustration, set 61 may be selected as a sub-set of set 54 randomly or in any other convenient manner in accordance with other embodiments of the present invention. Evaluation data set 63 is selected from the archive data records on interval $t_5$ through $t_6$ so that evaluation data set 63 does not overlap statistics file data set 54. Deactivation records 62 and 64 record the times when accounts were blocked, i.e. service was discontinued, for the customers whose records are included in training data set 61 and evaluation data set 63, respectively.

Figure 6:
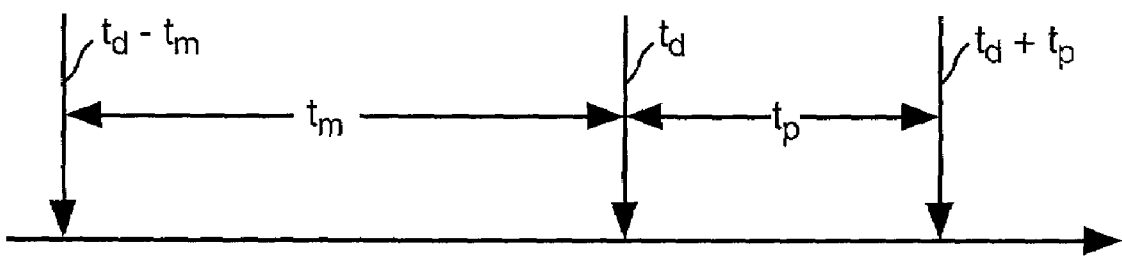
FIG. 6 shows a bad debt window, defined on the time line of FIG. 5, which defines a time window during in which files of customers whose accounts have been blocked will be labeled as a bad debt risk.

Program code 66 then controls data processing system 48 to download training data set 61 and associated deactivation record 62, and label those traffic data records in training data set 61 which are to be considered as indicating a toll risk. If a customer's account has been blocked, a bad debt window is defined around the deactivation time as determined from deactivation records 62. As is shown FIG. 6 the bad debt window extends from deactivation time $t_d$ for a prior time $t_m$ and for a subsequent time $t_p$. All traffic data records in training data set 61 which fall in the bad debt window from $t_d-t_m$ through $t_{d+tp}$ for the customer whose account has been blocked are labeled as representing a toll risk. Other data records falling outside of bad debt windows are not labeled as a toll risk. Program code 70 then controls data processing system 48 to download statistics file 60 and substitute corresponding statistics values for all categorical attributes in training data set 61. Training data set 61, with appended labels, and with statistics values substituted, forms training records 72, which are then uploaded to archive 44. Program code 74 then controls data processing system 48 to compute linear transformation coefficients for normalization, e.g. mean values and standard deviations for all attributes in training record 72, both substituted categorical attributes and continuous attributes. Scale file 78 is then uploaded to archive 44. By "continuous attribute" herein is meant an attribute that can be meaningfully treated mathematically. For example, a current balance and a past due balance can be added to obtain a balance due.

Evaluation data set 63 and associated deactivation record 64 are then processed in a substantially identical manner to generate evaluation data set 80, which is also uploaded to archive 44. No corresponding scale file is generated for evaluation records 80.

Effective values for $t_p$ and $t_m$ can be estimated by those familiar with credit analysis. Alternatively, values may be determined by evaluation of networks using various window sizes, as will be described further below. Appropriate numbers of records for training and evaluation files will vary with particular applications and can be determined by those skilled in the art by balancing of the costs and requirements of particular applications. In the embodiment disclosed in the present application a training file data set of approximately several hundred thousand to a million records has proven satisfactory.

Figure 7:
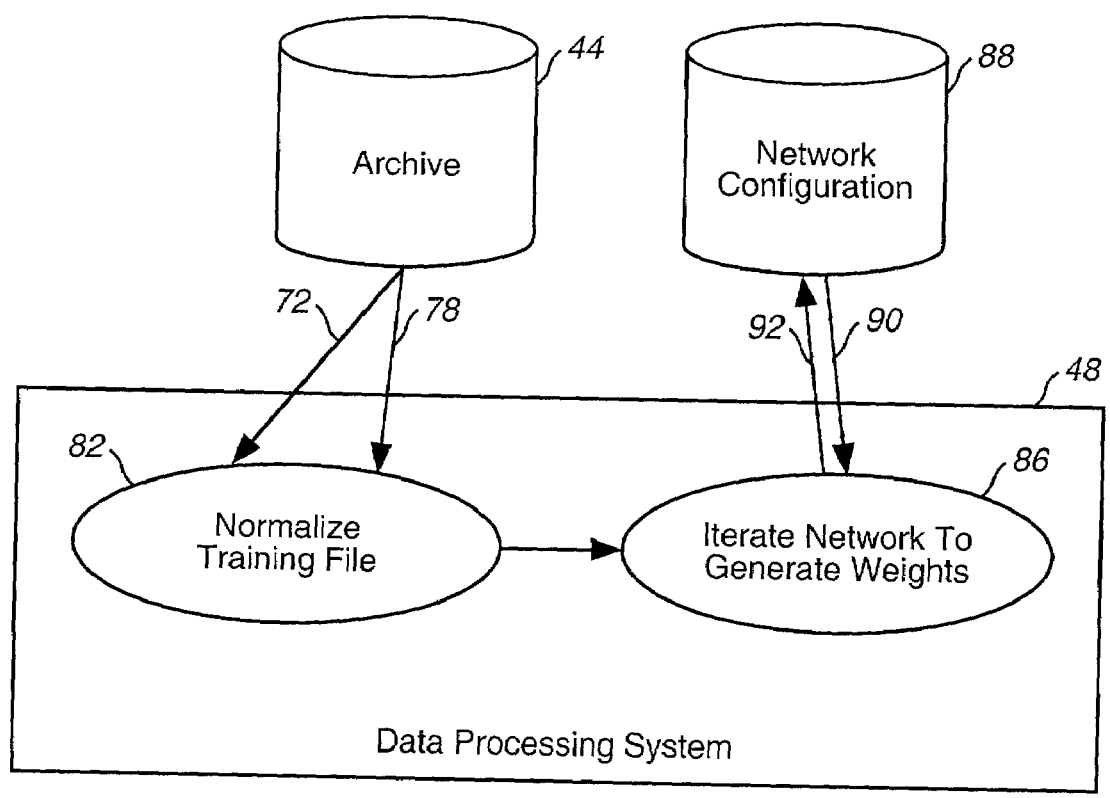
FIG. 7 shows a data processing system executing program code to train a neural network.

FIG. 7 shows a system for carrying out steps for training a neural network in accordance with an embodiment of the present invention. Program code 82 controls data processing system 48 to download training records 72 and scale file 78 and normalizes all attributes in training records 72 with respect to a linear transformation, e.g. using the corresponding mean values and standard deviations stored in scale file 78:

Normalized value=(value−mean value)/standard deviation.

Program code 86 then controls system 48 to download network topology 90 and an associated learning algorithm from network configuration data store 88 and to apply the normalized training records to the network so defined in accordance with the downloaded training algorithm. Preferably the network topology will be a three layer feed-forward topology and the training algorithm will be a back-propagation algorithm. Back-propagation training of feed-forward networks is well known to those skilled in the art and need not be discussed further here for an understanding of the subject invention.

Once the network defined by the downloaded network topology is trained weight file 92 containing the weights determined is uploaded to network configuration data store 88. It will also be apparent to those skilled in the arts that other known network topologies, or, as noted above, other known learning algorithms or artificial intelligence algorithms, can be trained by the system of FIG. 7 using associated training algorithms, and a production network, or other algorithm, selected from among the various topologies and weight files determined by evaluation, as will be described further below.

Figure 8:
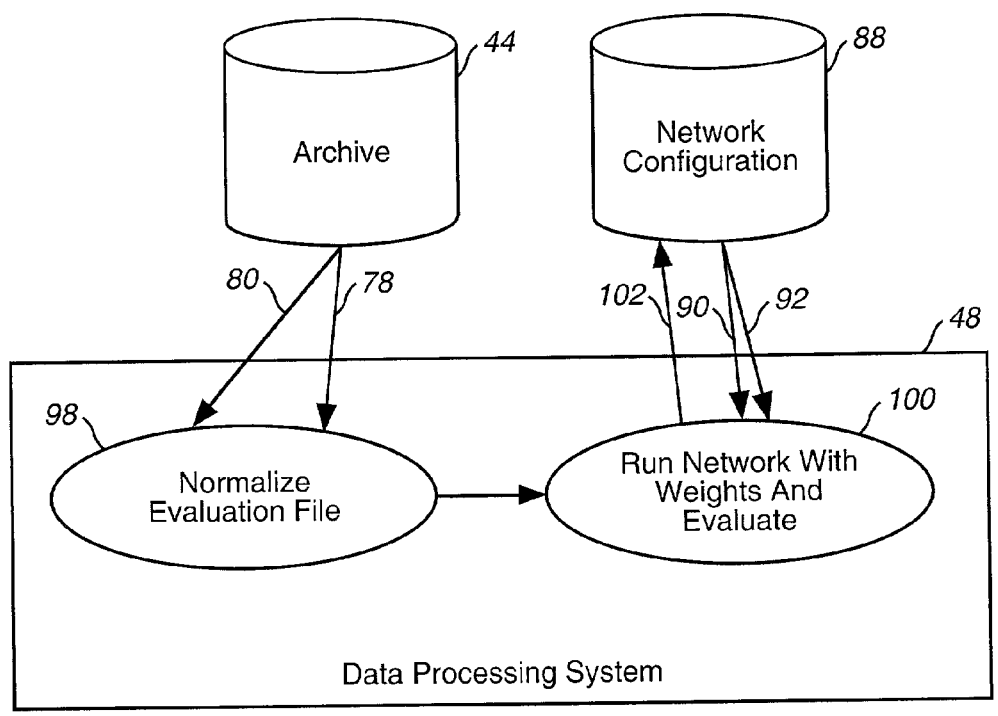
FIG. 8 shows a data processing system executing a program code to evaluate a trained neural network.

FIG. 8 shows a system for carrying out steps for evaluating neural networks. Program code 98 controls system 48 to download evaluation records 80 and scale file 78 and normalizes all attributes in evaluation records 80. Program code 100 then controls system 48 to download network topology 90 and weight file 92 and run the weighted network so defined with the normalized evaluation record as inputs. The evaluation records are then rank ordered in accordance with the corresponding outputs of the neural network. Outputs of the neural network are intended to be indicative of the relative likelihood that customers who are the subjects of the evaluation records represent toll risks.

As will be described further in the example set forth below, customer accounts are examined by analysts in the priority order described in paragraphs 46 above. Since it is not cost effective to provide enough analysts to review all customer accounts in a review period, an effective neural network (or other artificial intelligence algorithm) will include a higher percentage of target records in groups of records having higher AI scores. Given an evaluation set of records that are labeled as either target (e.g. bad debt) or non-target (e.g. not bad debt), it is possible to evaluate the performance of one or more AI algorithms that have been trained to identify the target records. The evaluation process involves processing each of the records (i.e. feature vectors) in the evaluation set through each AI algorithm to be evaluated. A score is generated by each algorithm for each record. For each algorithm, order the records by highest score to lowest. Then for each of these orders, corresponding to the different algorithms, count how many target records are identified in the top N records, for N=100, 200, 500, 1000, 2000, 3000, 4000, etc. It is then possible to compare the different algorithms by evaluating which one more effectively pushes the target accounts into the top of the order (and the non-target accounts to the bottom of the order). Specific attention is given to the area of the rankings, which forms the operating range of the system. If the system, including any human element, can only investigate the top 2000 records in a day, then that is the operating range of the system and performance below that level is less critical. Using the above process, the effectiveness of a given algorithm is evaluated by multiple factors, including measuring the extent to which higher AI scores correspond to the target characteristic (e.g. the potential of toll risk), and the false positive rate associated with the algorithm.

It will also be apparent that the method and system of FIG. 8 is used with evaluation records that have binary labels, e.g. are labeled as corresponding, or not corresponding, to a bad debt risk. It is also within the contemplation of the present invention that evaluation records (or training records) can be labeled over a range of values to more precisely represent the degree of risk that a customer represents; for example either by having an experienced analyst review the records, or by prorating the degree of risk with the likelihood that the customer will repay. For evaluation records so labeled correlation between the label values and the network outputs will represent the effectiveness of the network outputs.

It has been demonstrated that network topology and training algorithms have a relatively lesser effect on the performance of the present invention, while the pre-processing of attributes, particularly substitution of statistics relating categorical attributes to characteristics of subjects, has had a substantial positive effect.

Figure 9:
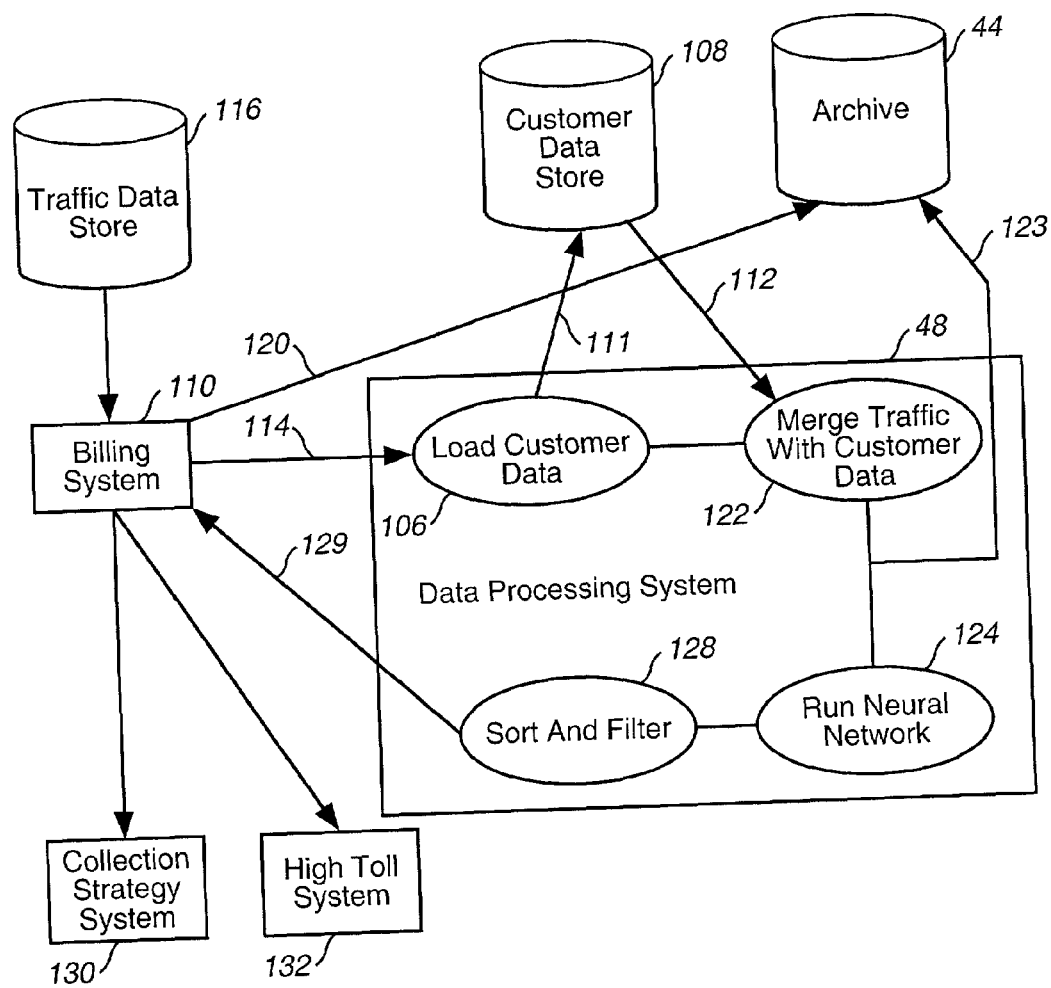
FIG. 9 shows a data processing system executing a program code in accordance with an embodiment of the present invention for the evaluation of customer toll risk.

FIG. 9 shows a system for carrying out steps for rank ordering records in an order that approximates the toll risk represented by customers who are subjects of the records. Program code 106 controls data processing system 48 to communicate with customer data store 108 and billing system 110 to download current updates 111 for customer data 112 and current traffic records 114 from system 110 and to update customer data 112. Billing system 110 is typically a mainframe computer that maintains a database of traffic information in order to generate periodic bills for customers. Customer data store 108 stores customer data 112, which includes customer static data, descriptive of the customer, account data such as current balance due, and address data.

Program code 122 then controls data processing system 48 to merge customer data 112 and traffic records 114. Merged data 123 is returned to archives 44, together with deactivation records, as described above, for use in further training. Program code 124 runs a neural network whose topology and weights are determined as described above and which generates an output which is an estimate for the toll risk represented by the customer who is the subject of the corresponding record. Operation of system 48 in response to code 124 will be described further below. Program code 128 then controls processing system 48 to sort and filter the records in accordance with the output of the neural network and returns rank order data 129 to system 110. Data 129 is thus a measure of the relative likelihood that customers who are subjects of the records are potential bad debt risks. Data 129 is then used by collections systems, such as Collection Strategy System 130 and High Toll System 132, as will be described further below.

Program code 106 and 122 can also be used to process and store records to establish the initial set of archived records used to develop and train network 10 as described above with respect to FIGS. 3–8.

Figure 10:
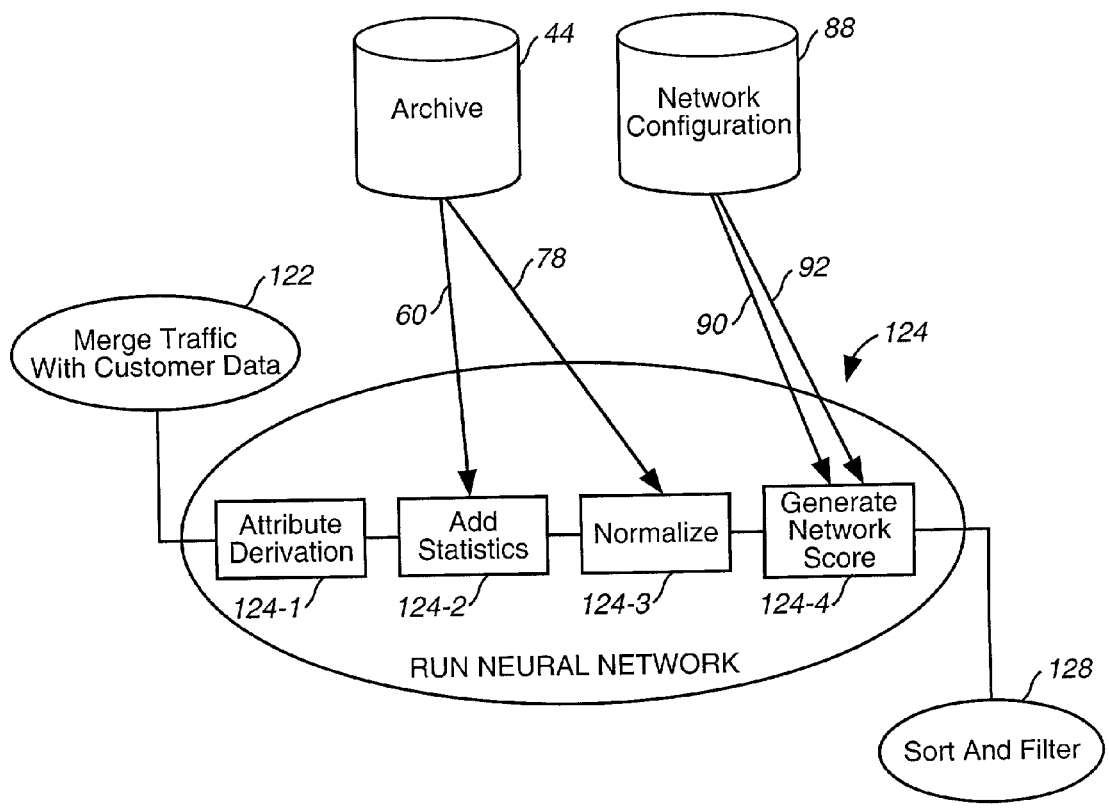
FIG. 10 shows a more detailed representation of one element of the program code shown in FIG. 9.

FIG. 10 shows a more detailed representation of program code 124. Code 124 receives the merged data from code 122. The data includes a Customer ID, which is not an input to the neural network but is used for record identification; Customer static data; Address data; Account data; traffic record from billing system 110; a commercial credit score (optional); a commercially provided decision tree score (optional); and Penitentiary history data (optional), which is a record of customers who are authorized to receive phone calls from a penitentiary. The penitentiary history data, while having predictive value, may not be utilized for reasons of social policy. For similar policy reasons, only the first three digits of the zip code are used.

Program code 124-1 then computes a feature vector that is used for further processing from the merged data. The attribute record (i.e. feature vector) consists of a heading, continuous attributes, and categorical attributes. Some of the attributes are derived, as will be explained below.

Derived fields, i.e. fields containing derived attributes, are also added by program code 124 and contain data that is calculated from fields in the merged data from program code 122. Addition of such derived fields has been found to improve performance of the present invention. As a hypothetical example, suppose that the duration of calls is highly predictive of whether or not a customer is likely to become delinquent but that the attribute data only includes start and stop times of calls. By computing call duration as a derived field in the feature vector an improved network may be created. Derived fields can also include aggregations of data (e.g. total cost of calls over the past N days). Appropriate derived fields can be selected based on a combination of knowledge of particular applications and evaluation of the resulting neural network as described above. Adding more attributes is not always better, but is done only after considering the relevance analysis described earlier. Highly correlated and duplicate attributes should also be avoided when deriving attributes.

Program code 124-2 then downloads statistics file 60 from archive 44 and substitutes values of the appropriate statistic for values of the categorical attributes. Program code 124-3 downloads scale file 78 from archive 44 and normalizes the attributes.

Program code 124-4 downloads configuration 90 and weights record 92 to configure a neural network; and applies a feature vector generated by program code 124-1, -2, and -3 as described above, to generate an output which is an estimate of the relative likelihood that the customer who is the subject of the corresponding record will prove to be a toll risk. This output can be used to rank order the records for further review but preferably the degree of risk will be included as a factor in determining the order of review, as described above in paragraph 41.

Figure 11:
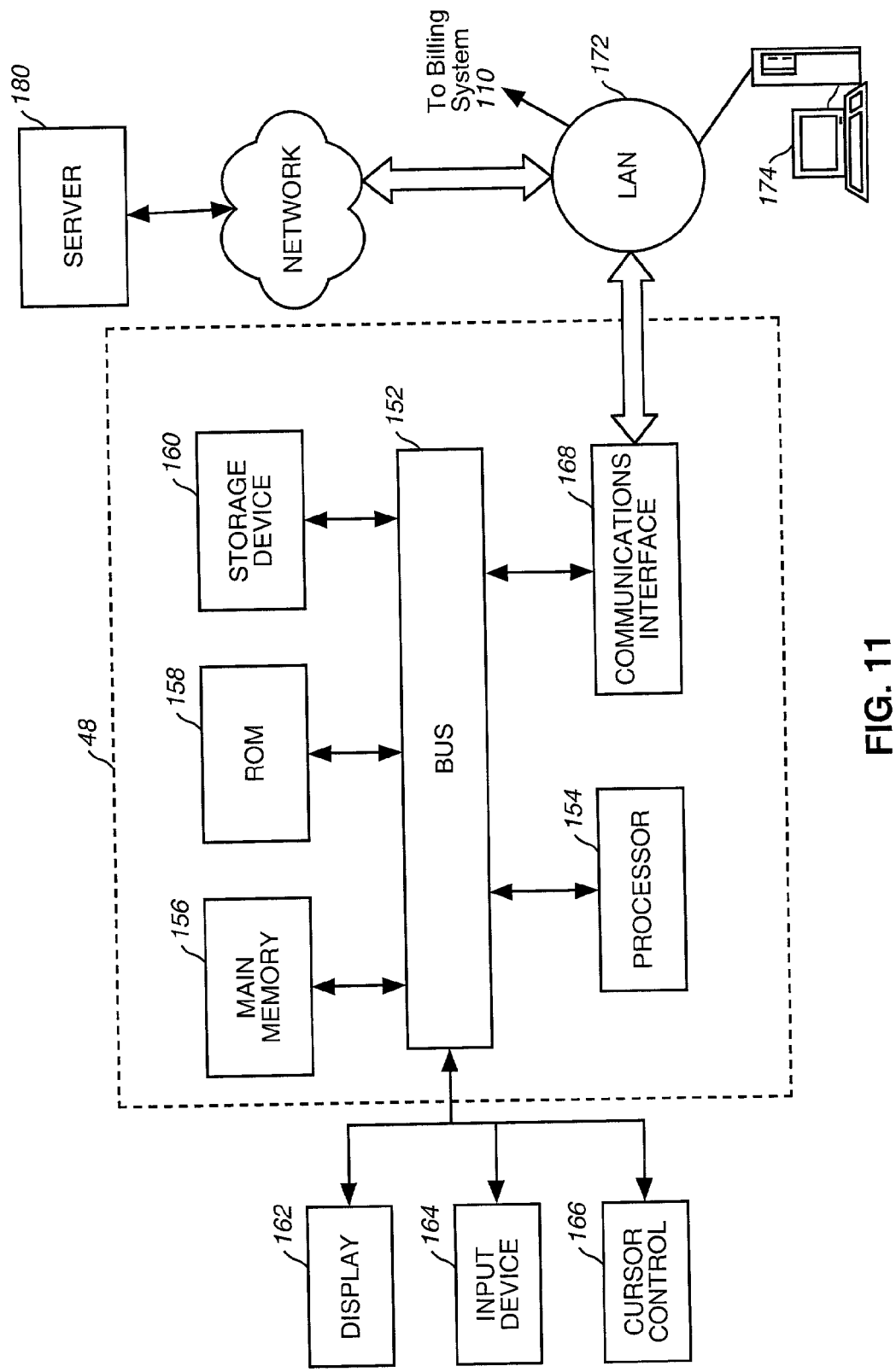
FIG. 11 shows a computer system used to execute various elements of program code in accordance with an embodiment of the present invention.

FIG. 11 is a block diagram that illustrates a more detailed representation of a general purpose computer system, which in some embodiments of the present invention can serve as data processing system 48, and upon which embodiments of the present invention can be implemented. Other architectures can also serve as data processing system 48, and any form of data processing system that can be programmed to carry out the functions described above is within the contemplation of the present invention. In the embodiments shown, data processing system 48 includes bus 152 or other communication mechanism for communicating information, and processor 154 coupled with bus 152 for processing information. Data processing system 48 also includes main memory 156, such as a random access memory (RAM) or other dynamic storage device, coupled to bus 152 for storing information and instructions to be executed by processor 154. Main memory 156 also may be used for storing temporary variables or other intermediate information during execution of instructions to be executed by processor 154. Data processing system 48 further includes a read only memory (ROM) 158 or other static storage device coupled to bus 152 for storing static information and instructions for processor 154. A storage device 160, such as a magnetic disk or optical disk, is provided and coupled to bus 152 for storing information and instructions.

Data processing system 48 may be coupled via bus 152 to a display 162, such as a cathode ray tube (CRT), for displaying information to a computer user. An input device 164, including alphanumeric and other keys, is coupled to bus 152 for communicating information and command selections to processor 154. Another type of user input device is cursor control 166, such as a mouse, a trackball, or cursor direction keys for communicating direction information and command selections to processor 154 and for controlling cursor movement on display 162. This input device typically has two degrees of freedom in two axes, a first axis (e.g., x) and a second axis (e.g., y), that allows the device to specify positions in a plane.

The invention is related to the use of data processing system 48 for development and training, evaluation, and running of a neural network to estimate a rank order of records in accordance with a characteristic of a subject of the records; and particularly to rank order records whose subjects are long distance service customers in accordance with the relative likelihood that a customer will become a toll risk. According to one embodiment of the invention, these functions are provided by data processing system 48 in response to processor 154 executing one or more sequences of one or more instructions contained in main memory 156. Such instructions may be read into main memory 156 from another computer-readable medium, such as storage device 160. Execution of the sequences of instructions contained in main memory 156 causes processor 154 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 154 for execution. Such a medium may take many forms, including but not limited to, non-volatile media, volatile media, and transmission media. Non-volatile media include, for example, optical or magnetic disks, such as storage device 160. Volatile media include dynamic memory, such as main memory 106. Transmission media include coaxial cables, copper wire and fiber optics, including the wires that comprise bus 152. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASHEPROM, any other memory chip or cartridge, a carrier wave as described hereinafter, or any other medium from which a computer can read.

Various forms of computer readable media may be involved in carrying one or more sequences of one or more instructions to processor 154 for execution. For example, the instructions may initially be borne on a magnetic disk of a remote computer. The remote computer can load the instructions into its dynamic memory and send the instructions over a telephone line using a modem. A modem local to data processing system 48 can receive the data on the telephone line and use an infrared transmitter to convert the data to an infrared signal. An infrared detector coupled to bus 152 can receive the data carried in the infrared signal and place the data on bus 152. Bus 152 carries the data to main memory 106, from which processor 154 retrieves and executes the instructions. The instructions received by main memory 156 may optionally be stored on storage device 160 either before or after execution by processor 154.

Data processing system 48 also includes a communication interface 168 coupled to bus 152. Communication interface 168 provides a two-way data communication coupling to a network link 170 that is connected to a local network 172. For example, communication interface 168 may be an integrated services digital network (ISDN) card or a modem to provide a data communication connection to a corresponding type of telephone line. As another example, communication interface 168 may be a local area network (LAN) card to provide a data communication connection to a compatible LAN. Wireless links may also be implemented. In any such implementation, communication interface 168 sends and receives electrical, electromagnetic or optical signals that carry digital data streams representing various types of information.

Network link 170 typically provides data communication through one or more networks to other data devices such as billing system 110, or network link 170 also may provide a connection through local network 172 to a host computer 174 or to data equipment operated by an Internet Service Provider (ISP) 176. ISP 176 in turn provides data communication services through the worldwide packet data communication network, now commonly referred to as the "Internet" 178. Local network 172 and Internet 178 both use electrical, electromagnetic or optical signals that carry digital data streams. The signals through the various networks and the signals on network link 170 and through communication interface 168, which carry the digital data to and from data processing system 48, are exemplary forms of carrier waves transporting the information.

Data processing system 48 can send messages and receive data, including program code, through the network(s), network link 170, and communication interface 168. In the Internet example, a server 180 might transmit a requested code or data for an application program through Internet 178, ISP 176, local network 172 and communication interface 168. Data processing system 48 also can send messages and receive data, including program code, from host 174 through local network 172, network link 170, and communication interface 168. In accordance with the invention, one such downloaded application provides for neural network functions as described herein. The received code may be executed by processor 154 as it is received, and/or stored in storage device 160, or other non-volatile storage for later execution. In this manner, data processing system 48 may obtain application code in the form of a carrier wave.

In some embodiments of the present invention some or all of data stores 44, 88, and 108 are accessed through host 174 or through server 180 as described above, while in other embodiments some or all of these data stores are comprised in storage device 160.

While in the embodiments shown the functions described above have all been carried out by processor 48 in other embodiments one or more functions can be carried out by separate systems communicating through local network 172 or Internet 178 in a conventional manner.

Programming of system 48, or of other systems within the contemplation of the present invention, is well within the ability of those skilled in the art, and need not be described further here for an understanding of the present invention.

The present invention can also be used to estimate the extent to which subjects have certain characteristics. For example, insurers can use public health data to generate statistics files which relate life-style attributes to morbidity; and then develop, train and run neural networks, as described above, to generate output values which are a measure of the relative healthfulness of their customers.

A neural network having a three-layer, feed-forward topology; trained as described above with respect to FIGS. 3–8, has been found to be effective with the following inputs, shown in FIGS. 12, 13, and 14A, B and C. FIG. 12 shows traffic data records which have been found to be effective, and FIG. 13 shows customer data records consisting of customer static data 192, account data 194, and address data 198, which have also been found to be effective. FIG. 12 also shows optional attributes (marked "*"); the penitentiary history data, credit score and decision tree score described above. The decision tree score is a commercially available credit rating services provided by outside vendors. (While shown in FIG. 12 for convenience, the optional attributes typically are not part of the traffic record but are received separately.) This data is then combined, to generate a feature vector as show in FIGS. 14A, 14B and 14C consisting of customer ID 200, header information 202, categorical attributes 206, and continuous attributes 208. Certain fields (again marked with "*") of the feature vector shown in FIGS. 14A, 14B, and 14C are optional and may not be used for reasons of social policy, as discussed above. Statistic values are substituted for categorical attributes as described above and derived values are added. By derived values herein is meant input values that are generated by mathematically operating on stored attributes, or substituted statistics values. Derived attributes labeled as "short_" or "long_" are derived with respect to prior four and nine day intervals as described above in paragraph 36.

When these inputs were applied, and the outputs of data processing system 44 were incorporated into Collection Strategy System 130 and High Toll System 132, the following results were achieved. As noted above High Toll System 132 is a threshold based system where accounts are examined based on the size of the balance due. As a result, large accounts of very good customers are examined early and unnecessarily. When High Toll System 132 is modified to examine accounts in the order of the output in the neural network the ratio of accounts that are blocked to accounts examined more than doubles, and the average amount due in the account when blocked was reduced by approximately half. This demonstrates that the method of the subject invent is substantially more accurate and more quickly identifies toll risks. Additionally, the number of accounts identified for a "high risk" collection strategy was doubled. A cost saving was realized by identifying the low predictive value of the commercial credit score.

By improving the selection of the customers for various collection strategies, the overall warning to select ratio was approximately doubled. For a newly developed collection strategy, based directly on the neural network output, a remarkably high warning to select ratio was achieved.

Further, by using the present invention in combination with a pre-cancel block and an additional 30 day collection period, the cancel to warning ratio was decreased by a factor of about 3. That is, approximately two-thirds of customers who were warned restored their accounts to good status before cancellation was necessary. (When an account is canceled, simply paying the amount due may no longer restore service.)

These results are believed to show that the method and system of the present invention provide a more accurate evaluation of toll risk than known, commercially offered credit scores. Also, the invention is a robust and proven system.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A computer-implemented method for providing financial trending using artificial intelligence, said method comprising the steps of:
    generating a feature vector having elements derived from attributes in a record associated with an account, said elements including a value of a statistic corresponding to a value of a categorical attribute in said record the feature vector being generated for input to a trained artificial intelligence (AI) algorithm to obtain an AI score;
    determining a first risk probability according to the AI score;
    determining a second risk probability according to a balance value of the account; and
    outputting a prioritization value based on the first risk probability and the second risk probability, wherein the prioritization value specifies order of review of the record among a plurality of records.

2. A computer-implemented method as described in claim 1 wherein the account corresponds to one of a plurality of customers of a provider of goods or services.

3. A computer-implemented method as described in claim 2 wherein said provider is a provider of long distance services, and said attributes include attributes derived from current traffic data.

4. A computer-implemented method as described in claim 3 wherein said attributes include attributes derived from customer data.

5. A computer-implemented method as described in claim 3 wherein said statistic is derived from a statistic data set comprising a time line of archived records.

6. A computer-implemented method as described in claim 5 wherein said statistic data set includes data relating to customer service deactivations.

7. A computer-implemented method as described in claim 3 wherein said elements of said feature vector are normalized.

8. A computer-implemented method as described in claim 7 wherein said elements are normalized with respect to a training data set.

9. A computer-implemented method as described in claim 1 wherein said elements of said feature vector are normalized.

10. A computer-implemented method as described in claim 1 wherein said artificial intelligence algorithm is a trained neural network.

11. A computer-implemented method as described in claim 1 wherein said feature vector includes derived fields calculated from said attributes.

12. A computer-implemented method as described in claim 1 further comprising the step of:
    determining the prioritization value according to:
    Priority=[Prob(AI)+Prob(balance)]/[MaxProb(AI)+MaxProb(balance)], wherein Prob(AI) represents the first risk probability, MaxProb(AI) represents the maximum value of the Prob(AI), Prob(balance) represents the second risk probability, and MaxProb(balance) represents the maximum value of the Prob(balance).

13. A computer-implemented method as described in claim 12 where said characteristic is bad debt risk for said record and said variable of interest is a balance due.

14. A computer-implemented method for supporting financial trending using artificial intelligence, said method comprising:

a) selecting a group of records as training records, values of said characteristic being known for subjects of said training records;
b) selecting a current topology and learning algorithm to configure a neural network;
c) applying attributes from said training records and said known characteristic values for said subjects of said training records to said configured network to train said configured network to generate current weights, wherein the attributes are selected based on scores generated by a relevance analysis employing a plurality of different evaluation methods;
d) selecting a group of said records as evaluation records, values of said characteristic being known for subjects of said evaluation records;
e) applying attributes from said evaluation records to said trained configured network to generate said outputs for said evaluation records;
f) ordering said evaluation records in rank order in accordance with said outputs for said evaluation records;
h) evaluating said rank order of said evaluation records in accordance with predetermined criteria; and
j) modifying said current topology or learning algorithm or both to configure said network; and
k) repeating steps c) through j) a plurality of times to generate a plurality of neural networks; and
l) selecting one of said plurality of neural networks which best meets said criteria.

15. A computer-implemented method for supporting financial trending using artificial intelligence, said method comprising the steps of:
estimating a statistic relating values of a categorical attribute to a characteristic of subject among a plurality of subjects;
for each of said subjects, processing a plurality of attributes including said categorical attribute to generate an input vector descriptive of said each subject, said processing including substituting a value of said statistic for corresponding values of said categorical attribute, wherein said attributes are selected on the basis of a level of significance as determined by a relevance analysis employing a plurality of different evaluation methods;
for each of said subjects, generating an output value as a function of said input vector; and
using said output values as a measure of said relative likelihood or extent.

16. A computer-implemented method as described in claim 15 wherein said function is defined by a trained neural network and an associated set of weights.

17. A computer-implemented method as described in claim 15 wherein said feature vector includes derived fields calculated from said attributes.

18. A system for supporting financial trending using artificial intelligence, said system comprising:
means for generating a feature vector having elements derived from attributes in a record associated with an account, said elements including a value of a statistic corresponding to a value of a categorical attribute in said record the feature vector being generated for input to a trained artificial intelligence (AI) algorithm to obtain an AI score; and
means for determining a first risk probability according to the AI score;
means for determining a second risk probability according to a balance value of the account; and
means for outputting a prioritization value based on the first risk probability and the second risk probability, wherein the prioritization value specifies order of review of the record among a plurality of records.

19. A system as described in claim 18 wherein the account corresponds to one of a plurality of customers of a provider of goods or services.

20. A system as described in claim 19 wherein said provider is a provider of long distance services, said system further comprising means for providing said attributes, said attributes including attributes derived from current traffic data.

21. A system as described in claim 20 wherein said attributes further include attributes derived from customer data.

22. A system as described in claim 20 wherein said statistic is derived from a statistic data set comprising a time line of archived records.

23. A system as described in claim 22 wherein said statistic data set includes data relating to customer service deactivations.

24. A system as described in claim 20 further comprising means for normalizing said elements of said feature vector.

25. A system as described in claim 24 wherein said elements are normalized with respect to said training data set.

26. A system as described in claim 18 further comprising means for normalizing said elements of said feature vector.

27. A system as described in claim 18 where said artificial intelligence algorithm is a trained neural network.

28. A system as described in claim 18 where said feature vector includes derived fields calculated from said attributes.

29. A computer-readable medium carrying one or more sequences of one or more instructions for providing financial trending using artificial intelligence, the one or more sequences of one or more instructions including instructions which, when executed by one or more processors, cause the one or more processors to control said system to perform the steps of:
generating a feature vector having elements derived from attributes in a record associated with an account, said elements including a value of a statistic corresponding to a value of a categorical attribute in said record the feature vector being generated for input to a trained artificial intelligence (AI) algorithm to obtain an AI score;
determining a first risk probability according to the AI score;
determining a second risk probability according to a balance value of the account; and
outputting a prioritization value based on the first risk probability and the second risk probability, wherein the prioritization value specifies order of review of the record among a plurality of records.

30. A computer-readable medium as described in claim 29 wherein the account corresponds to one of a plurality of customers of a provider of goods or services.

31. A computer-readable medium as described in claim 30 wherein said provider is a provider of long distance services, and said attributes including attributes derived from current traffic data.

32. A computer-readable medium as described in claim 31 wherein said instructions cause the one or more processors to control said system to perform said applying step to apply attributes including attributes from customer data.

33. A computer-readable medium as described in claim 31 wherein said instructions cause the one or more processors to control said system to perform said estimating step to estimate said statistic from a statistic data set comprising a time line of archived records.

34. A computer-readable medium as described in claim 33 wherein said statistic data set includes data relating to customer service deactivations.

35. A computer-readable medium as described in claim 31 wherein said instructions cause the one or more processors to control said system to perform the further step of normalizing said elements prior to said estimating step.

36. A computer-readable medium as described in claim 35 wherein said instructions cause the one or more processors to control said system to normalize said elements with respect to said training data set.

37. A computer-readable medium as described in claim 29 wherein said instructions cause the one or more processors to control said system to perform the further step of normalizing said elements prior to said estimating step.

38. A computer-readable medium as described in claim 29 wherein said artificial intelligence algorithm is a trained neural network.

39. A computer-readable medium as described in claim 29 wherein said feature vector includes derived fields calculated from said attributes.

40. A computer-implemented method for determining financial risk associated with communication services, the method comprising the steps of:

retrieving traffic data corresponding to communication sessions associated with an account;

generating an input record including a portion of the traffic data and balance information of the account, wherein the input record is fed to a trained artificial intelligence (AI) process that outputs an AI score in response to the input record;

determining a first risk probability according to the AL score;

determining a second risk probability according to the account balance information;

outputting a prioritization value based on the first risk probability and the second risk probability; and transmitting the AI score and the prioritization value to a credit risk management system for determination of which accounts are to be analyzed.

* * * * *